(12) United States Patent
Lin et al.

(10) Patent No.: US 12,529,466 B2
(45) Date of Patent: Jan. 20, 2026

(54) ILLUMINATION SYSTEM AND ILLUMINATION METHOD

(71) Applicant: CHENG MEI INSTRUMENT TECHNOLOGY CO., LTD., Hsinchu County (TW)

(72) Inventors: Chih-Yuan Lin, Hsinchu County (TW); Chin-Yu Liu, Hsinchu County (TW); Yu-Wei Liu, Hsinchu County (TW); Hung-Chun Lo, Hsinchu County (TW); Chao-Yu Huang, Hsinchu County (TW); Chun-Pin Hsu, Hsinchu County (TW); Cheng-Tao Tsai, Hsinchu County (TW)

(73) Assignee: CHENG MEI INSTRUMENT TECHNOLOGY CO., LTD., Hsinchu County (TW)

( * ) Notice: Subject to any disclaimer, the term of this patent is extended or adjusted under 35 U.S.C. 154(b) by 0 days.

(21) Appl. No.: 18/807,467

(22) Filed: Aug. 16, 2024

(65) Prior Publication Data

US 2025/0243992 A1    Jul. 31, 2025

(30) Foreign Application Priority Data

Jan. 29, 2024   (TW) ................................ 113103402

(51) Int. Cl.
*F21V 13/02*    (2006.01)
*F21V 9/08*     (2018.01)
(Continued)

(52) U.S. Cl.
CPC ................ *F21V 13/02* (2013.01); *F21V 9/08* (2013.01); *G02B 27/1006* (2013.01); *F21Y 2113/13* (2016.08); *F21Y 2115/10* (2016.08)

(58) Field of Classification Search
CPC ........ F21V 13/02; F21V 9/08; G02B 27/1006
(Continued)

(56) References Cited

U.S. PATENT DOCUMENTS 6,256,073 B1 *   7/2001   Pettitt .................. H04N 9/3114
                                                         348/742
7,221,104 B2 *   5/2007   Lys ........................ H05B 45/46
                                                         315/312
(Continued)

FOREIGN PATENT DOCUMENTS

CN        113533344 A        10/2021
CN        219391780 U         7/2023
(Continued)

OTHER PUBLICATIONS

Office Action issued by TIPO dated Jan. 6, 2025 for TW113103402.
(Continued)

*Primary Examiner* — Bryon T Gyllstrom
(74) *Attorney, Agent, or Firm* — WPAT, P.C.; Anthony King

(57) ABSTRACT

The present application discloses an illumination system and an illumination method. The illumination system includes a first light source, a second light source, a light source controller and an optical path adjustment module. The first light source is configured to emit a first light at least corresponding to a first waveband, and the second light source is configured to emit a second light at least corresponding to a second waveband, wherein the first waveband is different form the second waveband. The light source controller is coupled to the first light source and the second light source, and is configured to control the first light source and the second light source individually. The optical path adjustment module is configured to guide at least one of the first light and the second light to an output optical path.

16 Claims, 11 Drawing Sheets

(51) Int. Cl.
*F21Y 113/13* (2016.01)
*F21Y 115/10* (2016.01)
*G02B 27/10* (2006.01)

(58) Field of Classification Search
USPC .................................................. 362/231
See application file for complete search history.

(56) References Cited

U.S. PATENT DOCUMENTS

| | | | | |
|---|---|---|---|---|
| 7,521,667 | B2* | 4/2009 | Rains, Jr. | G01J 3/0216 |
| | | | | 362/257 |
| 7,682,027 | B2* | 3/2010 | Buczek | A61B 90/36 |
| | | | | 362/231 |
| 7,905,605 | B2* | 3/2011 | Bierhuizen | H04N 9/3111 |
| | | | | 353/31 |
| 9,042,012 | B2* | 5/2015 | Weiss | G02B 27/141 |
| | | | | 359/387 |
| 10,694,113 | B1* | 6/2020 | Serles | B23K 26/032 |
| 11,808,443 | B2* | 11/2023 | Baaijens | F21V 9/40 |
| 2005/0063194 | A1* | 3/2005 | Lys | H05B 45/22 |
| | | | | 362/489 |
| 2006/0072314 | A1* | 4/2006 | Rains | F21K 9/62 |
| | | | | 362/231 |
| 2010/0295919 | A1* | 11/2010 | Maeda | H04N 1/1916 |
| | | | | 347/241 |
| 2019/0037183 | A1* | 1/2019 | Xu | H04N 9/3194 |
| 2023/0229094 | A1* | 7/2023 | Huisman | G03F 7/70616 |
| | | | | 355/67 |

FOREIGN PATENT DOCUMENTS

| | | |
|---|---|---|
| TW | 200710367 A | 3/2007 |
| TW | 200732651 A | 9/2007 |
| TW | I826284 B | 12/2023 |
| WO | 2022179186 A1 | 9/2022 |

OTHER PUBLICATIONS

English Summary of the Office Action issued by TIPO dated Jan. 6, 2025 for TW113103402.
English translation of the Search Report appended to the Office Action issued by TIPO dated Jan. 6, 2025 for TW113103402.
English abstract of TWI826284B.
English abstract of TW200732651A.
English abstract of CN 219391780U.
Office Action issued by TIPO dated Dec. 2, 2024 for TW113103403.
English Summary of the Office Action issued by TIPO dated Dec. 2, 2024 for TW113103403.
English translation of the Search Report appended to the Office Action issued by TIPO dated Dec. 2, 2024 for TW113103403.
English abstract of TW200710367A.
English abstract of WO2022/179186A1.
English abstract of 113533344A.

* cited by examiner

ILLUMINATION SYSTEM AND ILLUMINATION METHOD

CROSS-REFERENCE TO RELATED APPLICATIONS

This application claims priority of Taiwan application No. 113103402, filed on Jan. 29, 2024, which is incorporated by reference in its entirety.

BACKGROUND OF THE PRESENT DISCLOSURE

Field of the Present Disclosure

The present disclosure relates to an illumination system, and more particularly, to an illumination system of a wide waveband.

Description of the Prior Art

Automated optical inspection (AOI) performs object surface inspection by using machine vision, and features high-speed and high-precision characteristics. However, the AOI requires a wide waveband in an optical system so as to detect different types of manufacturing defects; for example, in addition to visible light, a waveband of a detection light source may need to further cover ultraviolet light and infrared light. Although light emitting diodes (LED) or laser light sources are advantageous in terms of having long durability and high stability, wavelength ranges thereof are rather narrow, resulting in limited detection effects. Therefore, there is a need for a solution for an illumination system of a wide optical waveband so as to improve performance of AOI.

SUMMARY OF THE PRESENT DISCLOSURE

One aspect of the present disclosure provides an illumination system. The illumination system includes a first light source, a second light source, a light source controller, and a first optical path adjustment module. The first light source is configured to emit a first light at least corresponding to a first waveband. The second light source is configured to emit a second light at least corresponding to a second waveband, wherein the first waveband is different from the second waveband. The light source controller is coupled to the first light source and the second light source, and is configured to individually control the first light source and the second light source. The first optical path adjustment module is configured to guide at least one of the first light and the second light to an output optical path.

Another aspect of the present disclosure provides an illumination method. The illumination method includes providing a first light source to emit a first light corresponding to a first waveband, providing a second light source to emit a second light corresponding to a second waveband, wherein the first waveband is different from the second waveband, guiding the first light and the second light to an output optical path by a first optical path adjustment module, and irradiating an object under inspection by a first output light output from the output optical path.

DETAILED DESCRIPTION OF THE EMBODIMENTS

Figure 1:
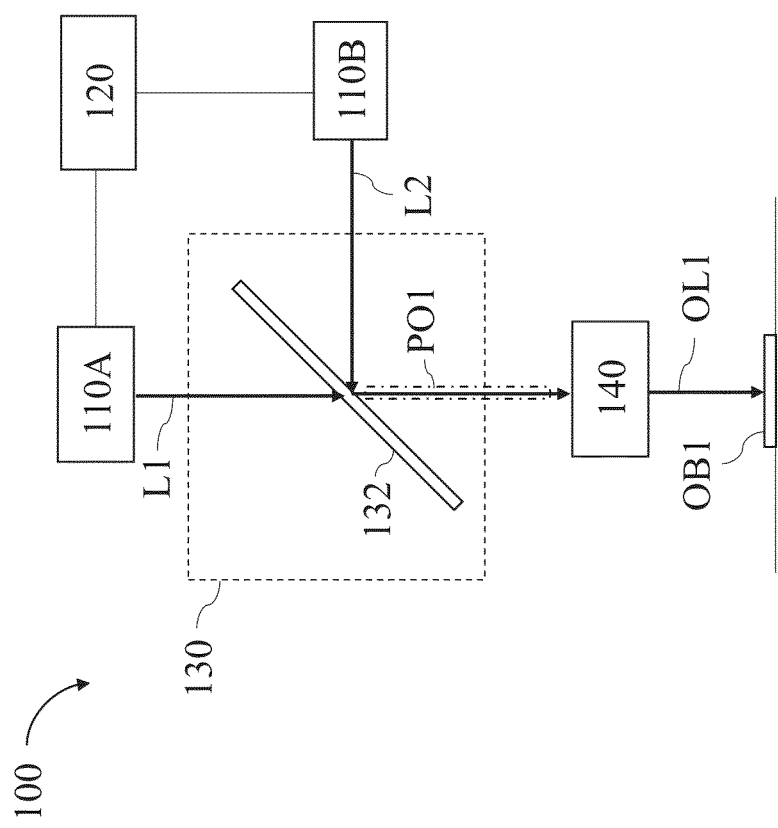
FIG. 1 is a schematic diagram of an illumination system according to an embodiment of the present application.

FIG. 1 shows a schematic diagram of an illumination system 100 according to an embodiment of the present application. The illumination system 100 includes a light source 110A, a light source 110B, a light source controller 120 and an optical path adjustment module 130. The light source 110A can emit a light L1 corresponding to a first waveband, and the light source 110B can emit a light L2 corresponding to a second waveband, wherein the first waveband is different form the second waveband. The light source controller 120 can be coupled to the light source 110A and the light source 110B, and can control each of the light source 110A and the light source 110B. In some embodiments, the optical path adjustment module 130 can guide the light L1 and the light L2 to an output optical path PO1. Moreover, the illumination system 100 can further include a light radiation member 140. The light radiation member 140 can receive a light output by the output optical path PO1 to irradiate an object OB1 under inspection by an output light OL1. The optical path adjustment module 130 can guide the light L1 and the light L2 having different wavebands to the same output optical path PO1, so that the object OB1 under inspection can be irradiated by the output light OL1 covering more wavebands. Thus, an illumination effect of a wider waveband can be achieved, thereby enhancing accuracy of automated optical inspection (AIO).

In some embodiments, the optical adjustment module 130 can include a beam splitter 132. The beam splitter 132 can be configured to allow the light L1 emitted by the light source 110A to pass through and then enter the output optical path PO1, and reflect the light L2 emitted by the light source 110B to the output optical path PO1. In some embodiments, the beam splitter 132 can be, for example, a dichroic mirror, which allows the light L1 corresponding to the first waveband to pass through, and reflects the light L2 corresponding to the second waveband. However, the present application is not limited to the example above. In some other embodiments, the beam splitter 132 can also be, for example, a pellicle mirror, which allows the light L1 and the light L2 to partially pass through and partially reflects the light L1 and the light L2.

Moreover, in some embodiments, the lights L1 and L2 emitted by the light sources 110A and 100B can correspond to different wavebands and/or different color temperatures, or have different intensities and/or different polarization states. For example, the light L1 emitted by the light source 110A can be far-infrared light, and the light L2 emitted by the light source 110B can be near-infrared light. Alternatively, the light L1 emitted by the light source 110A can be deep-ultraviolet light, and the light L2 emitted by the light source 110B can be near-ultraviolet light. Alternatively, the light L1 emitted by the light source 110A can be visible light, and the light L2 emitted by the light source 110B can be invisible light such as ultraviolet light or infrared light. However, the present application is not limited to the examples above.

In some embodiments, the light source 110A and the light source 110B can include LEDs or laser sources of corresponding wavebands. Since wavebands of LEDs and laser sources are rather narrower, lights can be combined by the optical adjustment module 130 of the illumination system 100, so as to produce the output light OL1 having a wider waveband. In some embodiments, the light L1 emitted by the light source 110A and the light L2 emitted by the light source 110B can also correspond to more than one waveband. For example, the light source 110A can include an LED or a laser source corresponding to multiple wavebands, or other types of light sources, for example but not limited to, a xenon (Xe) lamp and/or a halogen lamp. Similarly, the light source 110B can also include an LED or a laser source corresponding to multiple wavebands, or other types of light sources, for example but not limited to, a xenon (Xe) lamp and/or a halogen lamp. In such case, by blending the lights L1 and L2 emitted by different light sources 110A and 110B with the optical path adjustment module 130, the waveband of the output light OL1 can be expanded so as to meet the inspection requirements.

In some embodiments, the light radiation member 140 can be an optical fiber, and can be coupled to the output optical path PO1 and guide the output light OL1 to an appropriate light exit position so as to irradiate the object OB1 under inspection. In some embodiments, an output end of the optical fiber of the light radiation member 140 can have a shape of dot, a shape of strip or other shapes, and can, for example but not limited to, irradiate the object under inspection at a perpendicular angle; in such case, the output light OL1 can be a bright-field light. However, the present application is not limited to the examples above. In some embodiments, the output end of the optical fiber of the light radiation member 140 can also have a ring shape, a strip shape or other shapes, and can laterally irradiate the object under inspection at a lower angle, in such case, the output light OL1 can be a lateral light or a dark-field light. Moreover, the present application is not limited to forming the light radiation member 140 by an optical fiber; in some embodiments, the light radiation member 140 can be formed of other materials. Moreover, in some embodiments, the light radiation member can be omitted from the illumination system 100, and illumination is performed directly by the output optical path OP1 aligned with the object under inspection.

In some embodiments, since the light source controller 120 can individually control the light sources 110A and 110B, the light source controller 120 can control only one of the light sources 110A and 110B in some cases without blending lights. In some embodiments, the illumination system 100 further allows a user to replace the light sources 110A and 110B corresponding to different wavebands, for example, replacing the light source 110A with a light source corresponding to another waveband. The illumination system 100 can further allow a user to replace the beam splitter 132 in the optical path adjustment module 130, so as to match the waveband of the light source actually used to maintain the beam combination effect.

Figure 2:
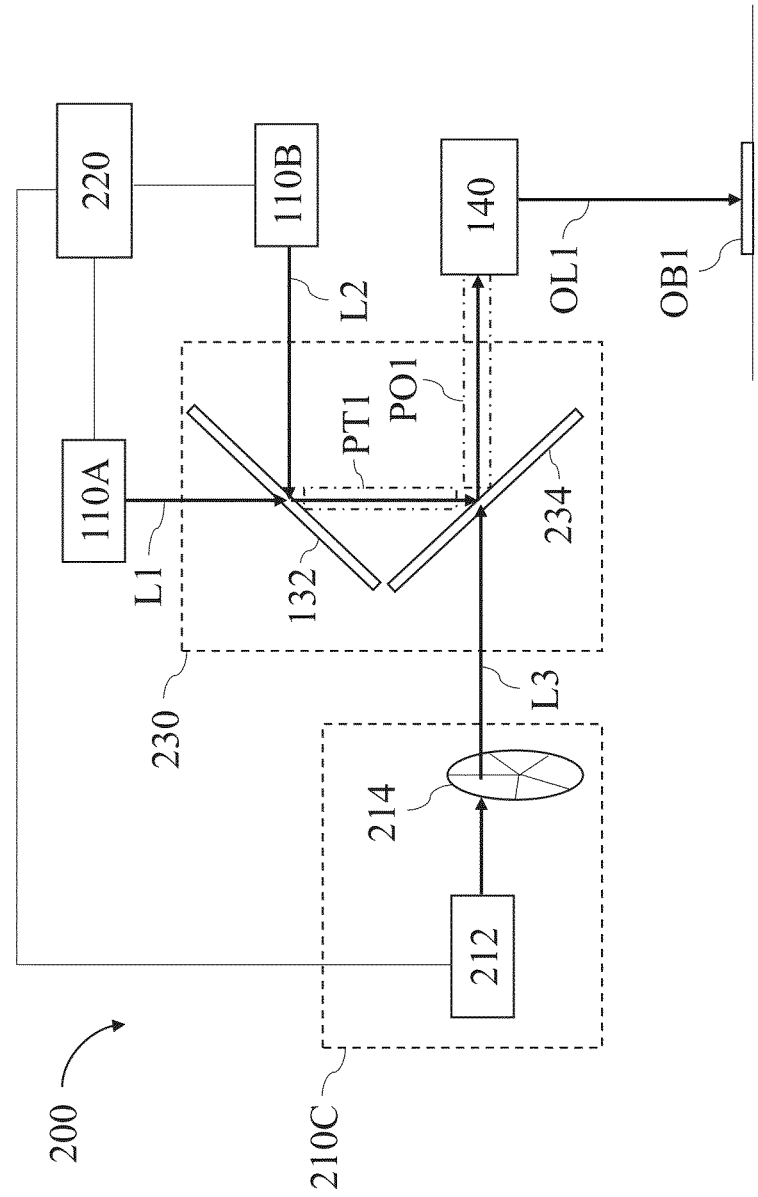
FIG. 2 is a schematic diagram of an illumination system according to another embodiment of the present application.

FIG. 2 shows a schematic diagram of an illumination system 200 according to another embodiment of the present application. The illumination system 200 has a structure similar to that of the illumination system 100, but further includes a light source 210C. The light source 210C can emit a light L3 corresponding to a third waveband, which can be different form the first waveband and the second waveband. In some embodiments, an optical path adjustment module 230 in the illumination system 200 can include the beam splitter 132 and a beam splitter 234. In some embodiments, the beam splitter 132 can be configured to allow the light L1 emitted by the light source 110A to pass through and then enter an optical path PT1, and reflect the light L2 emitted by the light source 110B into the optical path PT1. Moreover, the beam splitter 234 is configured to guide the light L3 emitted by the light source 210C and the lights L1 and L2 entering the optical path PT1 to the output optical path PO1. The light radiation member 140 can further receive and guide the light on the output optical path PO1 so as to irradiate the object OB1 under inspection by the output light OL1.

In the embodiment in FIG. 2, the light source 210C can include, for example, a white light source 212 and an adjustable filter 214. In some embodiments, the white light source 212 can include, for example, an LED (or a laser source) configured to emit a light of a predetermined color, and a fluorescent material corresponding to the light of the predetermined color. In this case, the fluorescent material can correspondingly emit a light of another color after absorbing the light emitted by the LED (or the laser source). With the LED (or the laser source) and the fluorescent material selected appropriately, the lights emitted by the LED (or the laser source) and the fluorescent material can be blended into a white light. However, the present application is not limited to the examples above. In some embodiments, the white light source 212 can also include a halogen lamp or xenon lamp.

In some embodiments, the adjustable filter 214 can include a plurality of color filters or attenuators, for example but not limited to, red, green, blue, cyan and colorless (transparent) filters or attenuators. The adjustable filter 214 can filter the white light emitted by the white light source 212 to thereby adjust the color of the light L3. In FIG. 2, the adjustable filter 214 can have the filters embedded in a wheel. Thus, by rotating the wheel, the corresponding color filter can be selected, and the light source 210C can emit the light of the corresponding color, which can then be blended with the lights L1 and L2 emitted by the light sources 110A and 110B. However, the present application does not specifically limit that the structure of the adjustable filter 214 to necessarily include the wheel. In other embodiments, the adjustable filter 214 can also be implemented by other adjustable mechanisms.

In some embodiments, the light emitted by the light source 210C can correspond to a waveband of visible light, and the lights L1 and L2 emitted by the light sources 110A and 110B can correspond to a waveband of invisible light (for example, near-ultraviolet light, deep-ultraviolet light, near-infrared light or far-infrared light). In such case, the output light OL1 of the illumination system 200 can cover wavebands of at least a part of visible light and at least a part of invisible light, thereby meeting the requirements of some specific applications. Moreover, in some embodiments, the light source controller 220 can individually control the light sources 110A, 110B and 210C. Thus, in some cases, the light source controller 220 can enable only one or two of the light sources 110A, 11B and 210C, thereby providing the output light OL1 of a required waveband according to actual requirements. In some embodiments, the illumination system 200 further allows a user to replace the light sources 110A, 110B and 220C corresponding to different wavebands, and further allows a user to replace the beam splitter 132 and the beam splitter 234 in the optical path adjustment module 230, so as to match the waveband of the light source actually used to thereby maintain the beam combination effect.

Figure 3:
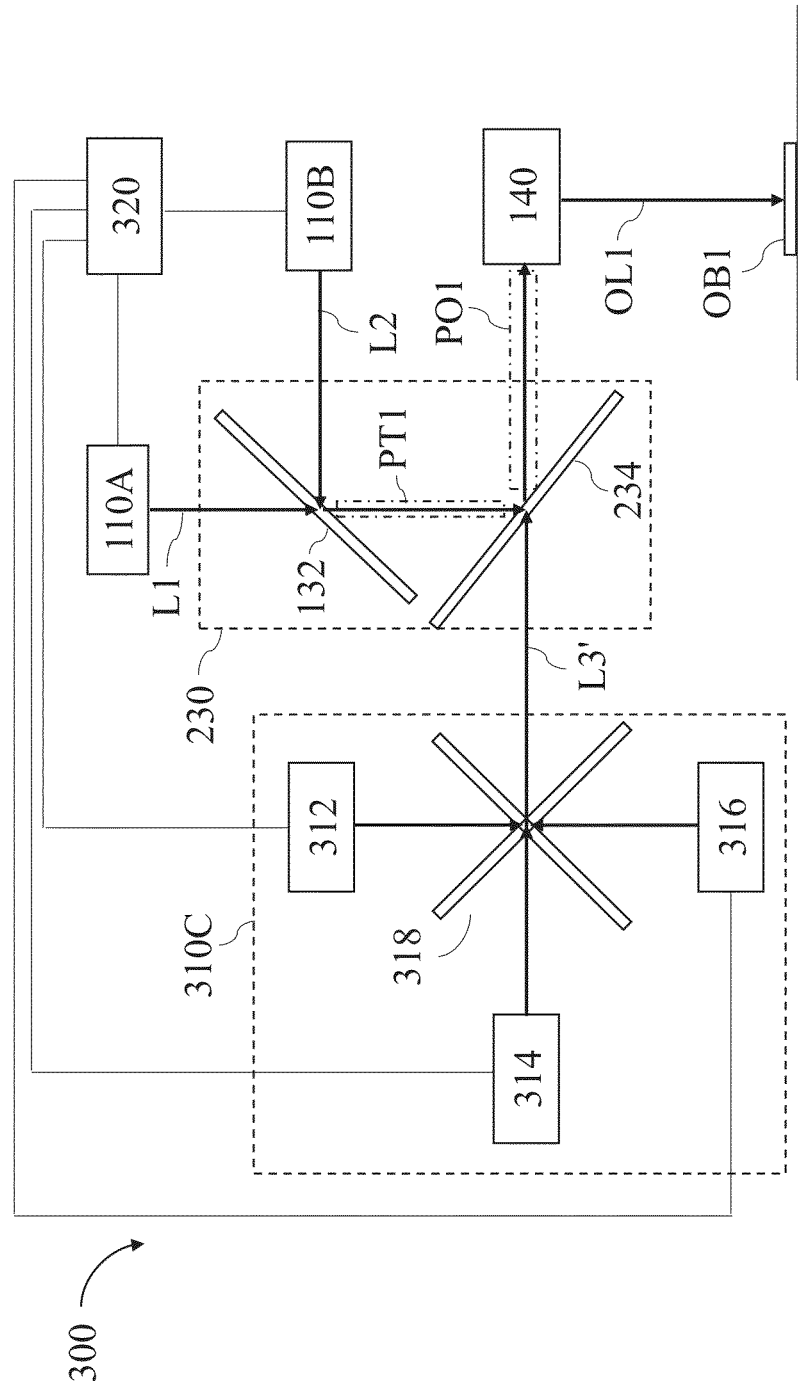
FIG. 3 is a schematic diagram of an illumination system according to another embodiment of the present application.

In the embodiment in FIG. 2, the white light emitted by the white light source 212 has an attenuated intensity after being filtered by the filters, such that the intensity of the light L3 emitted by the light source 210C is rather weak. In such case, single-colored LEDs (or laser sources) can be used to blend and form the white light. FIG. 3 shows a schematic diagram of an illumination system 300 according to another embodiment of the present application.

The illumination system 300 has a structure similar to that of the illumination system 200, but the illumination system 300 can use a light source 310C in substitution for the light source 210C. In the present embodiment, the light source 310C can include a red LED (or a red laser source) 312, a green LED (or a green laser source) 314, a blue LED (or a blue laser source) 316 and an X beam splitter 318. The red LED 312 can emit red light, the green LED 314 can emit green light, the blue LED 316 can emit blue light, and the X beam splitter 318 can combine the red light, the green light and the blue light into a light L3'. In some embodiments, the light source controller 320 can also control the red LED 312, the green LED 314 and the blue LED 316 in the light source 310C, and enable or disable the LED of a predetermined color so as to correspondingly adjust the color of the light L3'.

For example, the light source controller 320 can enable the red LED 312, the green LED 314 and the blue LED 316 to enable the light source 310C to emit white light. Alternatively, the light source controller 320 can enable only the red LED 312 and the green LED 314 and disable the blue LED 316. At this point, the light source 310C performs blending to form yellow light via the X beam splitter 318. Alternatively, the light source controller 320 can enable only one of the red LED 312, the green LED 314 and the blue LED 316. At this point, the light source 310C emits light of a single color of red, green or blue via the X beam splitter 318. Since the light source 310C can perform blending to form a light of a required color by using the red LED 312, the green LED 314 and the blue LED 316 without involving filters, the intensity of the light L3' can be preserved.

Moreover, in some embodiments, the light source controller 320 can individually control the light sources 110A and 110B. Thus, in some cases, the light source controller 320 can enable a part of light sources of the light sources 110A, 11B and 310C, thereby providing the output light OL1 with a desired waveband according to actual requirements. In addition, in some embodiments, the illumination system 300 further allows a user to replace the light sources 110A, 110B and 310C so as to integrate lights of different wavebands, and further allows a user to replace the beam splitters 132 and 234 in the optical path adjustment module 330, so as to match the waveband of the light source actually used to thereby maintain the beam combination effect. Thus, the illumination system 300 is able to provide illumination of a required waveband in a more flexible manner.

Figure 4:
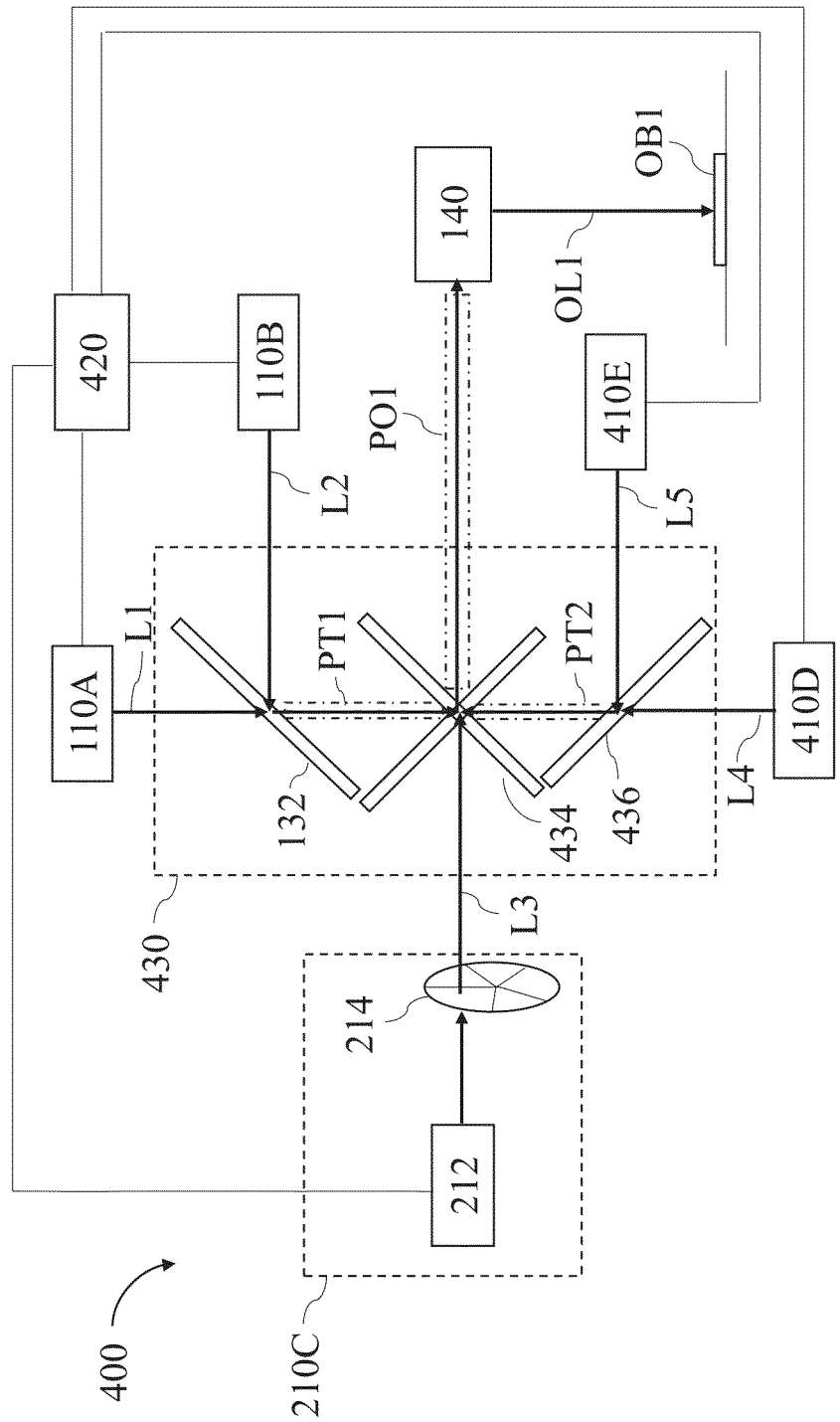
FIG. 4 is a schematic diagram of an illumination system according to another embodiment of the present application.

FIG. 4 shows a schematic diagram of an illumination system 400 according to another embodiment of the present application. The illumination system 400 has a structure similar to that of the illumination system 200, but further includes a light source 410D and a light source 410E. The light source 410D can emit a light L4 corresponding to a fourth waveband, and the light source 410E can emit a light L5 corresponding to a fifth waveband. In some embodiments, the first waveband corresponding to the light L1, the second waveband corresponding to the light L2, the third waveband corresponding to the light L3, the fourth waveband corresponding to the light L4 and the fifth waveband corresponding to the light L5 can be different from one another.

Moreover, in the illumination system 400, an optical path adjustment module 430 can include the beam splitter 132, an X beam splitter 434 and a beam splitter 436. The beam splitter 436 can be configured to allow the light L4 emitted by the light source 410D to pass through and then enter an optical path PT2, and reflect the light L5 emitted by the light source 410E into the optical path PT2. The X beam splitter 434 is configured to guide the lights L4 and L5 entering the optical path PT2 to the output optical path PO1. As such, all of the light L1 emitted by the light source 110A, the light L2 emitted by the light source 110B, the light L3 emitted by the light source 210C, the light L4 emitted by the light source 410D and the light L5 emitted by the light source 410E are guided to the output optical path PO1, and can be received and guided by the light radiation member 140, so that the object OB1 under inspection can be irradiated by the output light OL1 having a wide waveband.

Although in FIG. 4, the optical path adjustment module 430 depicts only the beam splitters 132 and 436 and the X beam splitter 434, the present application is not limited to the aforementioned examples. In some embodiments, the optical path adjustment module 430 can further include other lenses for adjusting an optical path. For example, a focusing lens can be disposed between the beam splitter 132 and the X beam splitter 434 so that the light on the optical path PT1 can enter the X beam splitter 434 in a relatively collimated manner. Similarly, a focusing lens can also be disposed between the light source 210C and the X beam splitter 434 so that the light L3 emitted by the light source 210C can enter the X beam splitter 434 in a relatively collimated manner. Moreover, a focusing lens can also be disposed between the beam splitter 436 and the X beam splitter 434 so that the light on the optical path PT2 can enter the X beam splitter 434 in a relatively collimated manner. Similarly, in the optical path adjustment modules 130, 230 and 330 and optical path adjustment modules shown in other embodiments of the present application, lenses can be disposed according to actual requirements so that the light can illuminate the object under inspection more effectively.

Moreover, in some embodiments, the light source controller 420 can individually control the light sources 110A, 110B, 210C, 410D and 410E. Thus, in some cases, the light source controller 320 can enable a part of light sources of the light sources 110A, 110B, 210C, 410D and 410E, thereby providing the output light OL1 of a required waveband according to actual requirements. Moreover, in some embodiments, the illumination system 400 can further allow a user to replace the light sources 110A, 110B, 210C, 410D and 410E so as to integrate lights of different wavebands, and can further allow a user to replace the beam splitters 132, the X beam splitter 434 and the beam splitter 436 in the optical path adjustment module 430, so as to match the waveband of the light source actually used to thereby maintain the beam combination effect. Thus, the illumination system 400 is capable of providing illumination for a required waveband in a more flexible manner.

Figure 5:
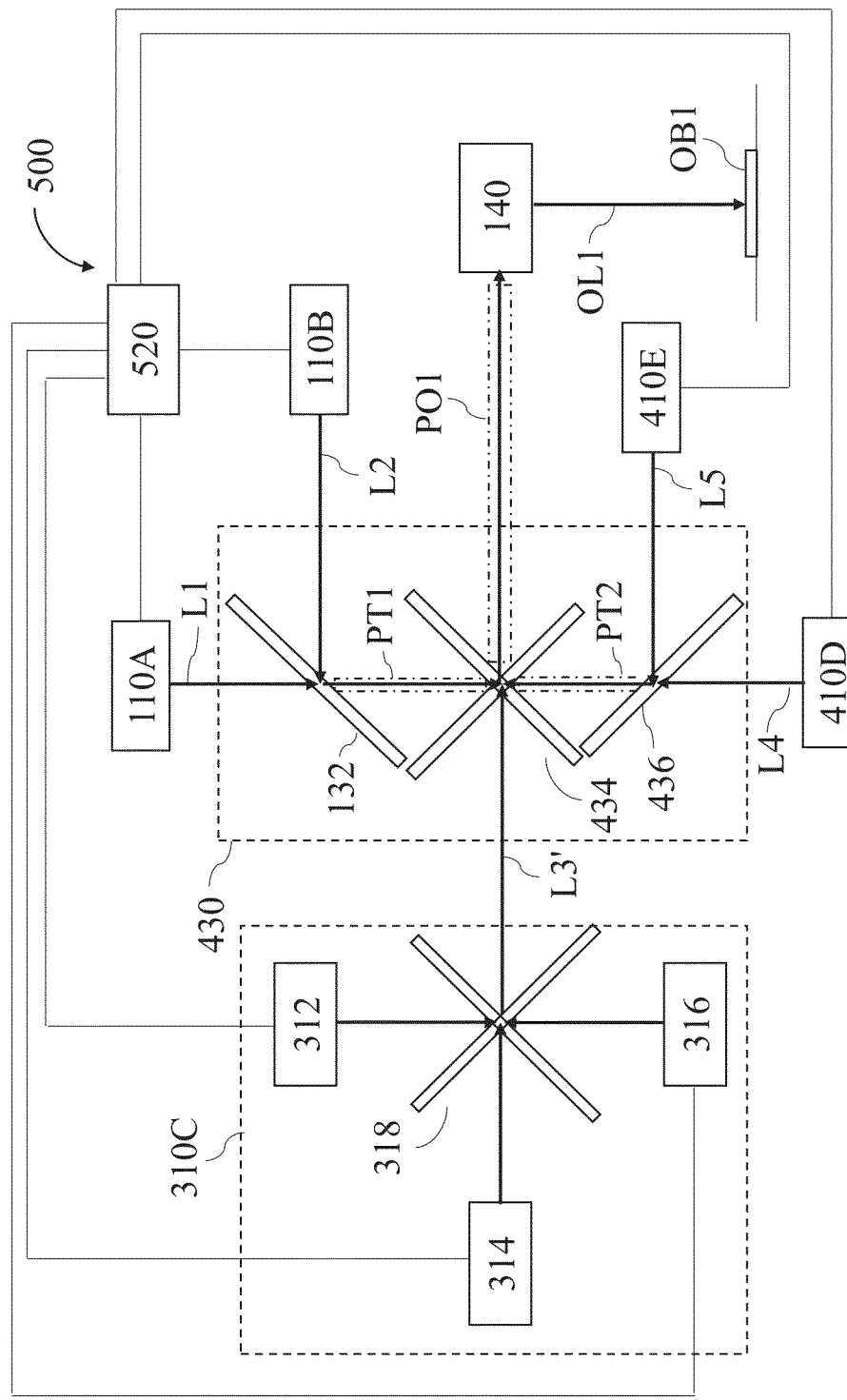
FIG. 5 is a schematic diagram of an illumination system according to another embodiment of the present application.

FIG. 5 shows a schematic diagram of an illumination system 500 according to another embodiment of the present application. The illumination system 500 has a structure similar to that of the illumination system 400, and differs in that a light source 310C is used in substitution for the light source 210C.

In some embodiments, the illumination systems 100, 200, 300, 400 and 500 can employ the light radiation member 140 to use the output light OL1 as a bright-field light or a dark-field light. In some embodiments, the illumination systems 100, 200, 300, 400 and 500 can employ the light radiation member 140 to use the output light OL1 as a bright-field light, and can further add other dark-field light sources.

Figure 6:
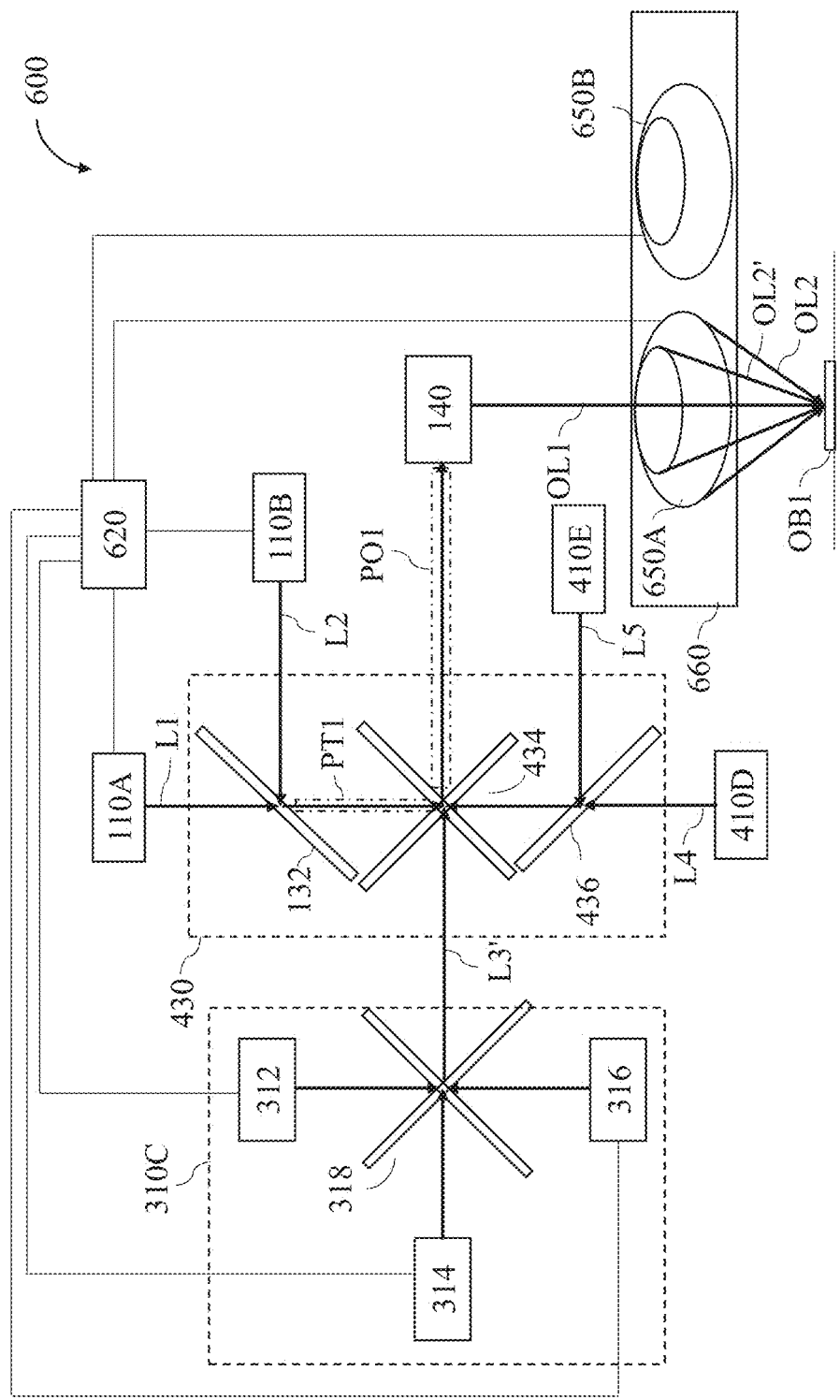
FIG. 6 is a schematic diagram of an illumination system according to another embodiment of the present application.

FIG. 6 shows a schematic diagram of an illumination system 600 according to another embodiment of the present application. The illumination system 600 has a structure similar to that of the illumination system 500, but can use the light radiation member 140 to output a bright-field light OL1 and further include dark-field light sources 650A and 650B and an optical path adjustment module 660. In some embodiments, a dark-field light emitted by the dark-field light source 650A and a dark-field light emitted by the dark-field light source 650B can correspond to different wavebands and/or different angles; the optical path adjustment module 660 can be configured to adjust positions of the dark-field light source 650A and the dark-field light source 650B, so as to select the dark-field light emitted by the dark-field light source 650A or the dark-field light emitted by the dark-field light source 650B as an output light, which together with the output light OL1 output by the light radiation member 140 irradiate the object OB1 under inspection.

In some embodiments, the optical path adjustment module 660 can include a turntable or a line track, allowing a user to manually or automatically adjust relative positions of the dark-field light sources 650A and 650B so as to match an output of the output light OL1. However, the present disclosure is not limited to the example above. In some embodiments, the optical path adjustment module 660 can also include other mechanisms or moving parts for a user to manually or automatically adjust the relative positions of the dark-field light sources 650A and 650B. Moreover, in some embodiments, since the optical path adjustment module 660 is able to select only the dark-field light emitted by the dark-field light source 650A or the dark-field light source 650B as an output light instead of using both at the same time, the light source controller 620 can also control the dark-field light sources 650A and 650B and enable only one of the dark-field light sources 650A and 650B, so as to reduce the power consumption.

In addition, the light source controller 620 can also control the light source 110A, the light source 110B, the light source 310C, the light source 410D and the light source 410E (to prevent complications in FIG. 6, lines connecting the light source controller 620 to the light source 410D and the light source 410E are not depicted; however, connecting line can exist between the light source controller 620 and the light source 410D and the light source 410E). Thus, in some cases, the light source controller 620 can enable only a part of the light sources of the light source 110A, the light source 110B, the light source 310C, the light source 410D and the light source 410E, so as to provide the output light OL1 of a required waveband in response to actual requirements.

In some embodiments, the dark-field light source 650A can have, for example, a ring structure; however, the present disclosure is not limited to the aforementioned example. In some embodiments, the dark-field light source 650A can also have other geometric shapes. Moreover, the dark-field light source 650A can include a plurality of LEDs disposed on a ring structure thereof, and the LEDs can include LEDs of different wavebands and/or LEDs disposed corresponding to different irradiation angles. That is to say, the dark-field light emitted by the dark-field light source 650A can include multiple wavebands, and/or can irradiate from different angles.

Figure 7:
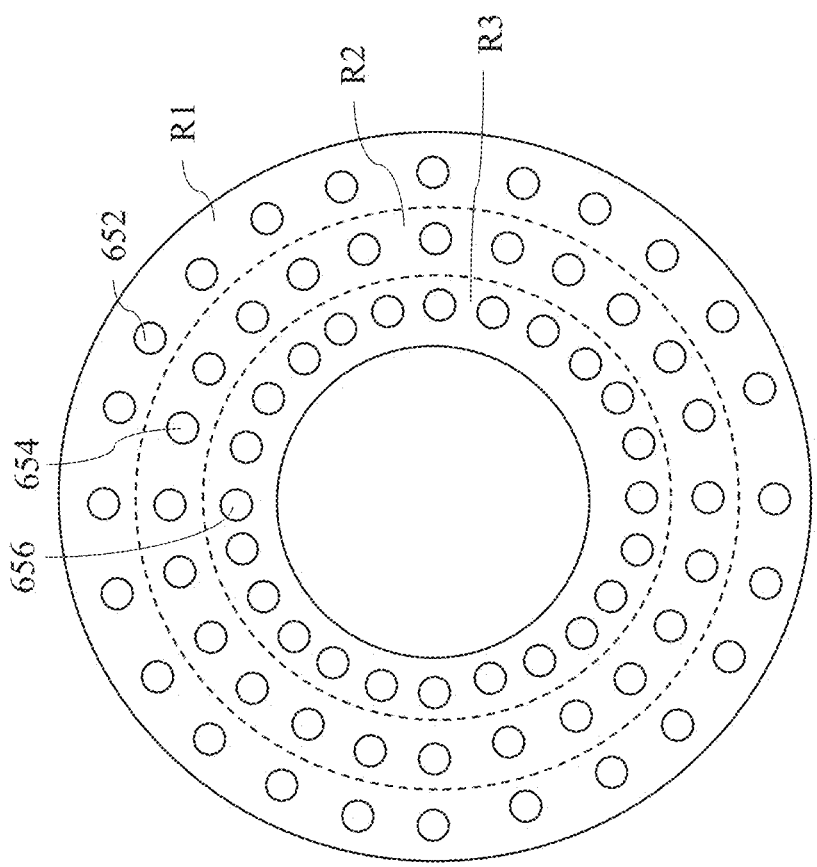
FIG. 7 is a schematic diagram of a dark-field light source according to an embodiment of the present disclosure.

FIG. 7 shows a schematic diagram of the dark-field light source 650A according to an embodiment of the present application. As shown in FIG. 7, the dark-field light source 650A can include light sources (for example but not limited to, LEDs or optical fibers) arranged in multiple layers, for example, multiple light sources 652 are located on a first layer R1, multiple light sources 654 are located on a second layer R2, and multiple light sources 656 are located on a third layer R3. In the present embodiment, the light sources 652, 654 and 656 in the dark-field light source 650A can be arranged as rings of a bowl, and thus when the dark-field light source 650A is used to irradiate the object OB1 under inspection, the first layer R1 can be closer to the object OB1 under inspection and the third layer R3 can be farther away from the object OB1 under inspection. In such case, an output light OL2 generated by the multiple light sources 652 located on the first layer R1 can laterally illuminate the object under inspection at a lower angle, and an output light OL2' generated by the multiple light sources 656 located on the third layer R3 can laterally illuminate the object under inspection at a higher angle.

Moreover, in some embodiments, the light sources in the dark-field light source 650A can also be arranged in different layers within other geometric shapes, for example but not limited to, a rectangle or an ellipsoid, and dark-field lights at different angles can still be provided. In addition, the present disclosure does not limit that the light sources in the dark-field light source 650A need to be arranged into a bowl shape. In some other embodiments, the light sources in the dark-field light source 650A can also be arranged or disposed according to other patterns. For example, in some embodiments, the light sources in multiple layers in the dark-field light source 650A can be arranged on a same plane, and provide dark-field lights at different angles by using diffusers or reflectors.

In addition, in the present embodiment, the light sources 652, 654 and 656 located on the individual layers R1, R2 and R3 can also correspond to different wavebands and/or different intensities. In such case, the light source controller 620 can control and adjust the light sources 652, 654 and 656 in the dark-field light source 650A in a layer-by-layer manner, so as to provide a combination of required illumination angle, waveband and/or intensity. For example, in the embodiment shown in FIG. 6, the light source controller 620 can enable the light sources 652 located on the first layer R1 and the light sources 656 located on the third layer R3. However, the present disclosure is not limited to the example above. In some other embodiments, the light controller 620 can also simultaneously enable the light sources 652 located on the first layer R1, the light sources 654 located on the second layer R2 and the light sources 656 located on the third layer R3, or enable only the light sources 654 on the second layer R2 and the light source 656 located on the third layer R3. As such, the dark-field light source 650A is able to provide dark-field lights of multiple wavebands, multiple angles and multiple intensities.

Moreover, in the embodiment shown in FIG. 7, although each of the layers R1, R2 and R3 of the dark-field light source 650A includes multiple light sources, the present disclosure is not limited thereto. In some embodiments, the light sources in the dark-field light source 650A can also be implemented by optical fibers, for example but not limited to, the dark-field light source 650A can include optical fibers arranged in different layers, and the optical fibers of each layer can be configured to provide a dark-field light of a predetermined angle and/or a predetermined waveband. In such case, the light source controller 620 can still individually control the optical fibers in a layer-by-layer manner, so that the dark-field light source 650A can provide dark-field lights of multiple wavebands, multiple angles and multiple intensities as the output light.

Similarly, the dark-field light source 650B can have a structure similar to that of the dark-field light source 650A, and can be configured to provide dark-field lights of multiple wavebands, multiple angles and multiple intensities. In some embodiments, after a user selects the dark-field light source 650A or the dark-field light source 650B for use by the optical path adjustment module 660, the illumination system 600 further allows the user to adjust the position of the selected dark-field light source to thereby adjust an irradiation angle of the dark-field light.

Figure 8:
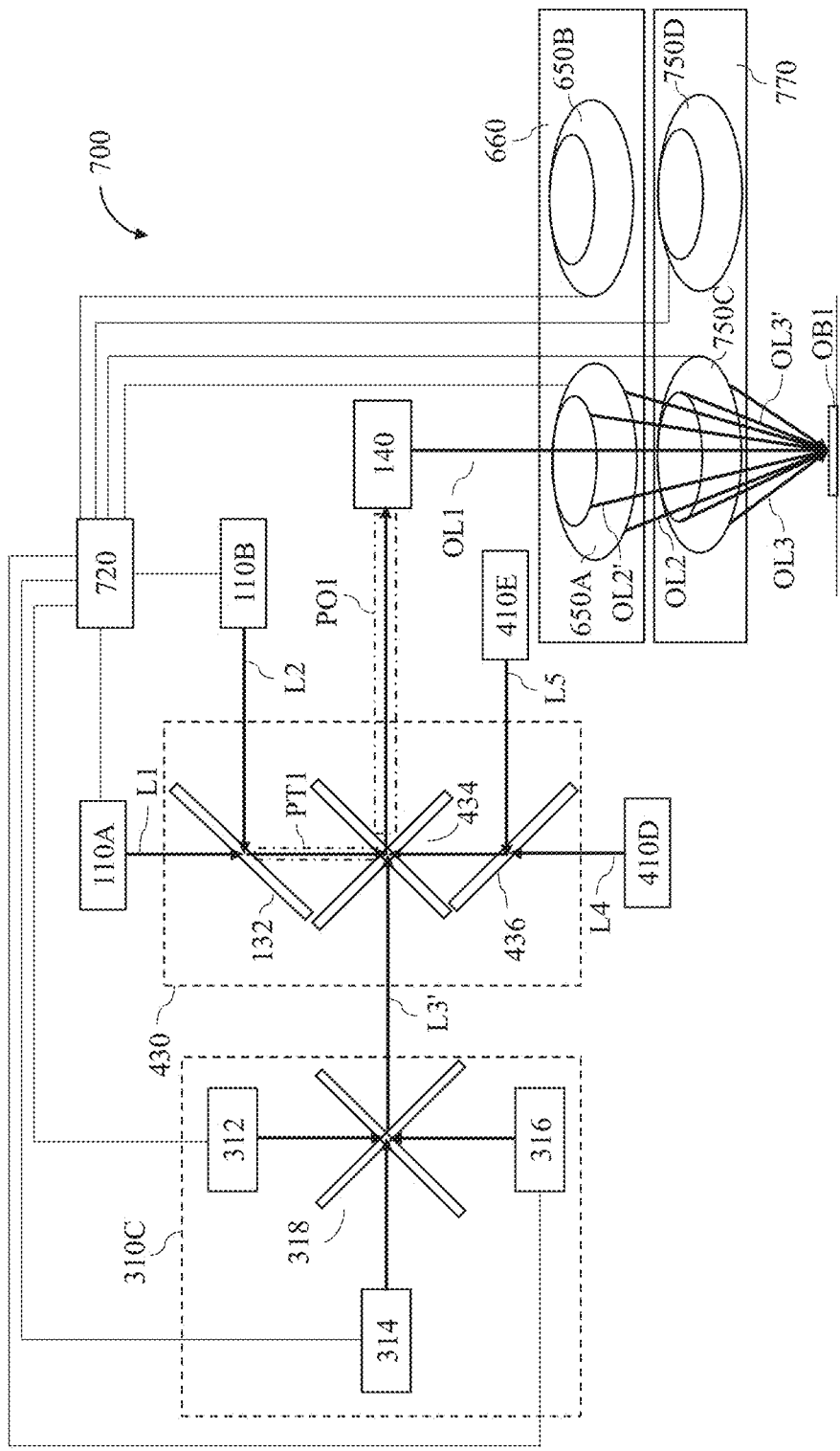
FIG. 8 is a schematic diagram of an illumination system according to another embodiment of the present application.

FIG. 8 shows a schematic diagram of an illumination system 700 according to another embodiment of the present application. The illumination system 700 has a structure similar to that of the illumination system 600, but further includes a dark-field light source 750C, a dark-field light source 750D and an optical path adjustment module 760. In some embodiments, a dark-field light emitted by the dark-field light source 750C and a dark-field light emitted by the dark-field light source 750D can correspond to different wavebands; the optical path adjustment module 760 can be configured to adjust positions of the dark-field light source 750C and the dark-field light source 750D, so as to select the dark-field light emitted by the dark-field light source 750C or the dark-field light emitted by the dark-field light source 750D as an output light, which together with the output light OL1 output by the light radiation member 140 and the output light emitted by the dark-field light source 650A or 650B irradiate the object OB1 under inspection. In some embodiments, the dark-field light sources 750C and 750D can have structures similar to that of the dark-field light source 650A, and thus can each include light sources in multiple layers, and the light source controller 720 can separately control the light sources in the dark-field light sources 750C and 750D in a layer-by-layer manner, so as to provide dark-field lights of multiple wavebands, multiple angles and multiple intensities. For example, as shown in FIG. 8, the dark-field light source 650A can emit output lights OL2 and OL2' having different incident angles, and the dark-field light source 750C can emit output lights OL3 and OL3' having different incident angles.

Moreover, in the embodiment shown in FIG. 8, the incident angles and wavebands of the output lights emitted by the dark-field light sources 650B and 650C and irradiated upon the object OB1 under inspection can be different from the incident angles and wavebands of the output lights emitted by the dark-field light sources 750C and 750D and irradiated upon the object OB1 under inspection. That is to say, a user can select, by the optical path adjustment module 660, the dark-field light of the dark-field light source 650A as an output light, and can select, by the optical path adjustment module 760, the dark-field light of the dark-field light source 750C as another output light, thereby achieving illumination effects of dark-field lights having more angles and more wavebands.

In addition, the light source controller 720 can also control the light sources 110A, 110B, 310C, 410D and 410E (to prevent complications in FIG. 7, lines connecting the light source controller 720 to the light source 410D and the light source 410E are not depicted; however, connecting line can exist between the light source controller 720 and the light source 410D and the light source 410E), and the dark-field light sources 650A, 650B, 750C and 750D. Thus, in some cases, the light source controller 720 can enable only a part of the light sources of the light sources 110A, 110B, 310C, 410D and 410E, so as to provide the output light OL1 of a required waveband in response to actual requirements, and can enable only a part of the dark-field light sources of the dark-field light sources 650A, 650B, 750C and 750D.

Figure 9:
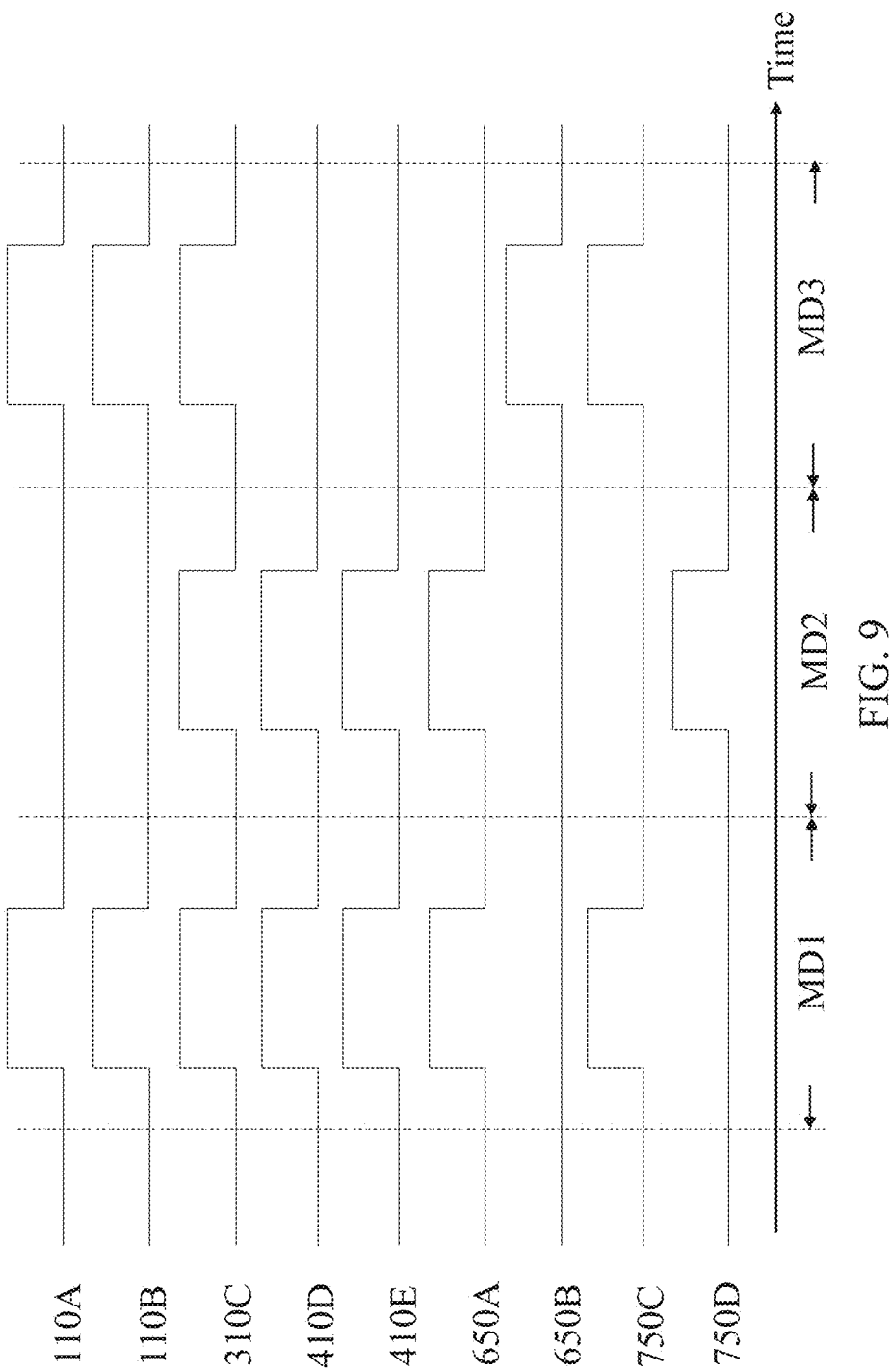
FIG. 9 is a control timing diagram of the illumination system in FIG. 7 according to an embodiment of the present application.

FIG. 9 shows a control timing diagram of the illumination system 700 in FIG. 7 according to an embodiment of the present application. In the present embodiment, the light source controller 720 can enable different light source combinations in different modes in response to difference inspection requirements.

For example, during a period MD1, the illumination system 700 is in a first mode. At this point, the light source controller 720 can simultaneously enable the light sources 110A, 110B, 310C, 410D and 410E, and can simultaneously enable the dark-field light sources 650A and 750C (in such case, a user is expected to have selected, by the optical path selection module 660, the dark-field light source 650A to generate the output lights OL2 and OL2', and selected, by the optical path selection module 760, the dark-field light source 750C to generate the output lights OL3 and OL3'). During a period MD2, the illumination system 700 is in a second mode. At this point, the light source controller 720 can simultaneously enable the light sources 310C, 410D and 410E, and can simultaneously enable the dark-field light sources 650A and 750D (in such case, a user is expected to have selected, by the optical path selection module 660, the dark-field light source 650A to generate and output light, and selected, by the optical path selection module 760, the dark-field light source 750D to generate an output light). Moreover, during a period MD3, the illumination system 700 is in a third mode. At this point, the light source controller 720 can simultaneously enable the light sources 110A, 110B and 310C, and can simultaneously enable the dark-field light sources 650B and 750C (in such case, a user is expected to have selected, by the optical path selection module 660, the dark-field light source 650B to generate an output light, and selected, by the optical path selection module 760, the dark-field light source 750C to generate an output light).

Since the illumination system 700 can integrate bright-field lights and dark-field lights of different wavebands, illumination effects of a wide waveband and multiple angles can be achieved, thereby enhancing the accuracy of AOI. In addition, because the illumination system 700 is able to enable corresponding light source combinations in different modes by the light source controller 720, a user is provided with better flexibility, thereby meeting different inspection requirements.

In some embodiments, the light source controller 120 in the illumination system 100, the light source controller 220 in the illumination system 200, the light source controller 320 in the illumination system 300, the light source controller 1420 in the illumination system 400, the light source controller 520 in the illumination system 500 and the light source controller 620 in the illumination system 600 are similar to the light source controller 720 in the illumination system 700, and are able to enable light sources corresponding to specific wavebands, specific intensities and specific angles, so as to irradiate the object OB1 under inspection by specific light source combinations, thereby meeting different inspection requirements.

The illumination system 700 can include the light sources 110A, 110B, 310C, 410D and 410E configured to emit bright-field lights and the dark-field light sources 650A, 650B, 750C and 750D configured to dark-field lights. However, the present application is not limited to the examples above. In some embodiments, the illumination system can include only dark-field light sources.

Figure 10:
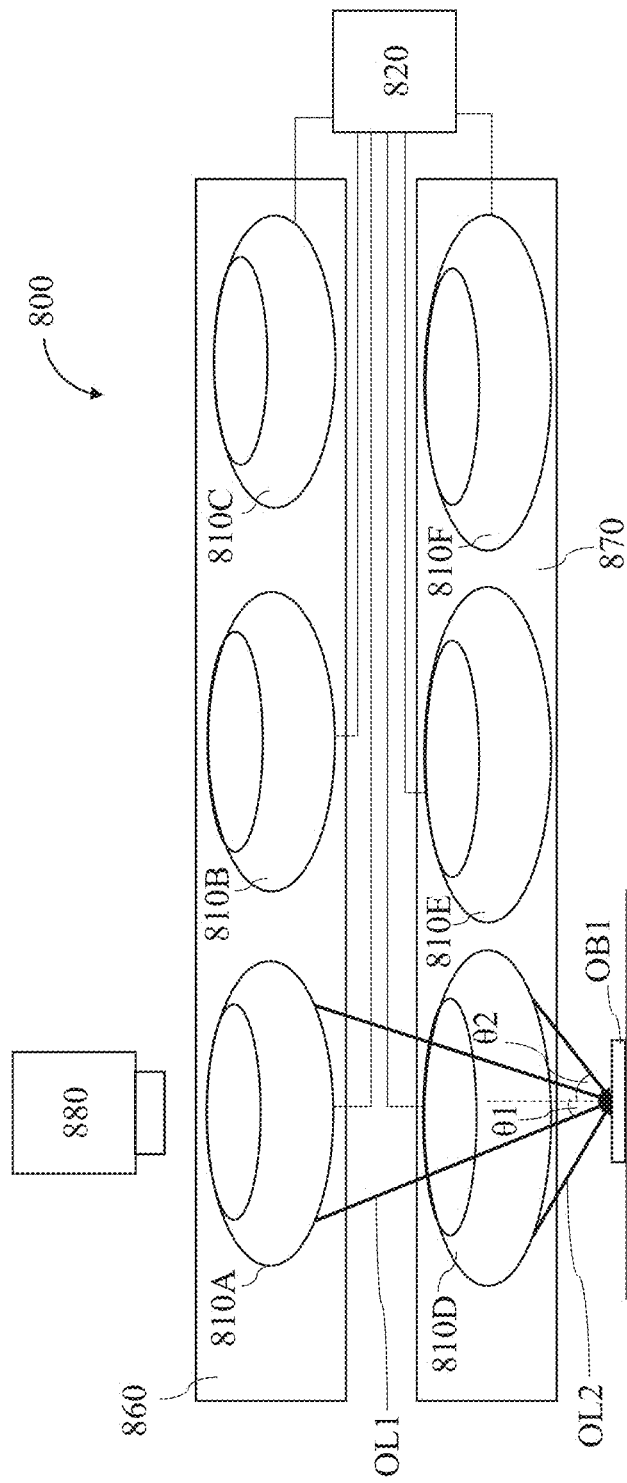
FIG. 10 is a schematic diagram of an illumination system according to another embodiment of the present application.

FIG. 10 shows a schematic diagram of an illumination system 800 according to an embodiment of the present application. The illumination system 800 includes light sources 810A, 810B and 810C and an optical path adjustment module 860. The light sources 810A, 810B and 810C can be configured as dark-field light sources and can each have a structure similar to the dark-field light source 650A, that is, the light sources 810A, 810B and 810C can be configured to emit output lights of multiple wavebands, multiple angles and multiple intensities. The optical path adjustment module 860 can include a moving member (for example but not limited to, a turntable or a line track), and can be configured to adjust positions of the light source 810A, the light source 810B and the light source 810C, so as to select a light emitted by the light source 810A, a light emitted by the light source 810B or a light emitted by the light source 810C as the output light OL1 to irradiate the object OB1 under inspection, and a reflected light from the object OB1 under inspection is received by a sensor 880 to perform inspection.

Moreover, the illumination system 800 can further include light sources 810D, 810E and 810F and an optical path adjustment module 860. The light sources 810D, 810E and 810F can also be configured as dark-field light sources, and each can have a structure similar to that of the dark-field light source 650A. Thus, each of the light sources 810D, 810E and 810F can emit output lights of multiple wavebands, multiple angles and multiple intensities. In some embodiments, the light sources 810D, 810E and 810F and the light sources 810A, 810B and 810C can irradiate the object OB1 under inspection at different angles. For example, in FIG. 10, a user can select, by the optical path adjustment module 860, the light source 810A to generate the output light OL1, and select, by the optical path adjustment module 860, the light source 810D to generate the output light OL2, wherein an incident angle θ1 of the output light OL1 irradiating the object OB1 under inspection is different from an incident angle θ2 of the output light OL2 irradiating the object OB1 under inspection. As such, the illumination system 800 can use dark-field light sources of different wavebands and/or different angles to irradiate the object OB1 under inspection, thereby improving performance of AOI. Moreover, in some embodiments, since each of the light sources 810A, 810B, 810C, 810D, 810E and 810F can emit dark-field lights of multiple wavebands, multiple intensities and multiple angles, the illumination system 800 can provide a user with more diversified and flexible light source combinations, thereby meeting requirements of inspection scenarios.

Moreover, the illumination system 800 can further include a light source controller 820, which can individually control the light sources 810A, 810B, 810C, 810D, 810E and 810F so that the light sources 810A, 810B, 810C, 810D, 810E and 810F can emit lights of required wavebands and required angles, and can enable light sources selected to irradiate the object under inspection and disable the remaining light sources so as to reduce power consumption.

Figure 11:
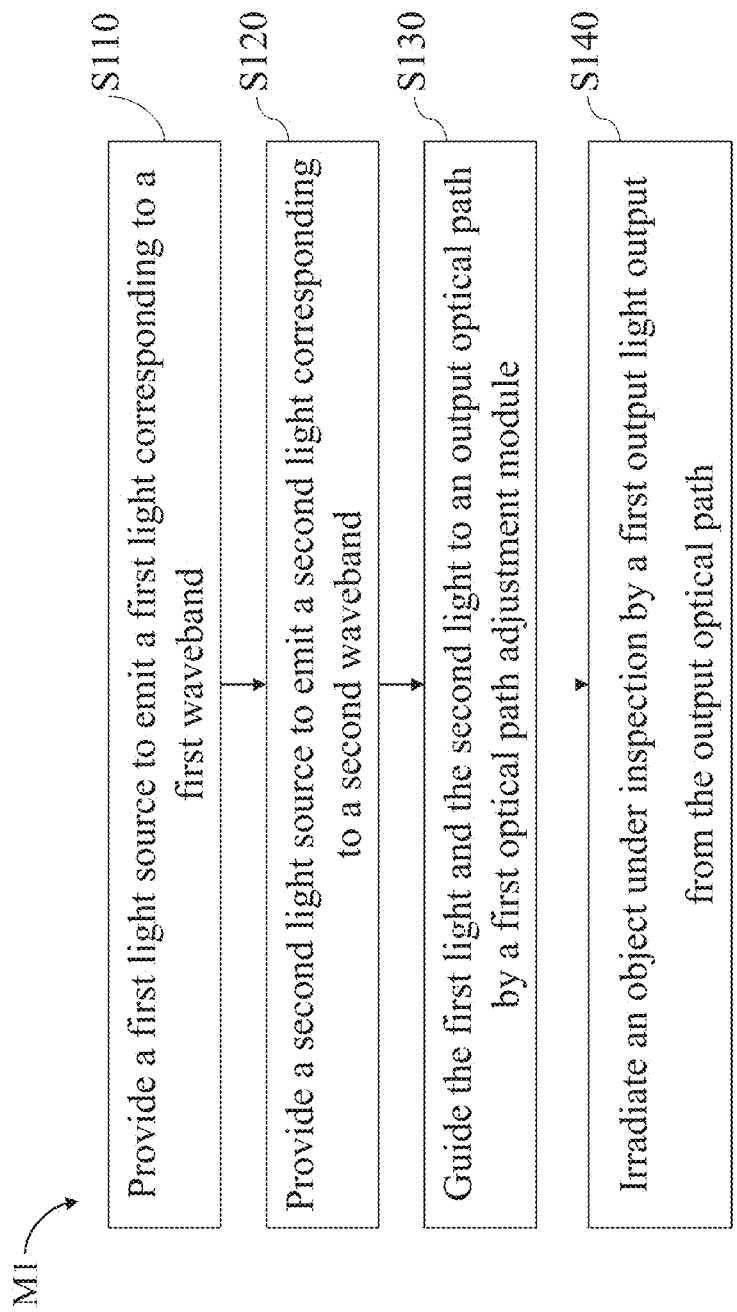
FIG. 11 is a flowchart of an illumination method according to an embodiment of the present application.

FIG. 11 shows a flowchart of an illumination method M1 according to an embodiment of the present application. The method M1 can include steps S110 to S140. In some embodiments, the illumination method M1 is applicable to the illumination system 100. For example, the light source 110A can be provided in step S110, and the light source 110B can be provided in step S120. Then, the light L1 emitted by the light source 110A and the light L2 emitted by the light source 110B can be guided to the output optical path PO1 by the optical path adjustment module 130 in step S130, and the light output from the output optical path PO1 can be irradiated upon the object OB1 under inspection by the light radiation member 140 in step S140.

In some embodiments, the method M1 can further include providing more light sources, and blending bright-field lights and/or dark-field lights of different wavebands and/or different angles by corresponding optical path adjustment modules, so as to apply the method M1 to the illumination systems 200, 300, 400, 500, 600 and 700. As such, illumination effects of a wide waveband and multiple angles can be achieved, hence enhancing accuracy of AOI.

In summary, the illumination system and the illumination method provided by the embodiments of the present application are able to an integrate bright-field lights and dark-field lights of different wavebands, and thus illumination effects of a wide waveband and multiple angles can be achieved, thereby enhancing accuracy of AOI. Moreover, the illumination system and the illumination method provided by the embodiments of the present application are able to enable corresponding light source combinations in different modes, and thus a user is provided with better flexibility of use, thereby meeting different inspection requirements.

What is claimed is:

1. An illumination system, comprising:
a first light source, configured to emit a first light at least corresponding to a first waveband;
a second light source, configured to emit a second light at least corresponding to a second waveband, wherein the first waveband is different from the second waveband;
a light source controller, coupled to the first light source and the second light source, configured to individually control the first light source and the second light source; and
a first optical path adjustment module, configured to guide at least one of the first light and the second light to an output optical path;
a light irradiation member configured to receive a light output by the output optical path to output a first output light irradiating upon an object under inspection;
a first dark-field light source, configured to emit a first dark-field light;
a second dark-field light source, configured to emit a second dark-field light; and
a second optical path adjustment module, configured to adjust positions of the first dark-field light source and the second dark-field light source, so as to selectively use the first dark-field light or the second dark-field light as a second output light, which together with the first output light irradiate the object under inspection;

wherein the first dark-field light and the second dark-field light correspond to different wavebands or different angles.

2. The illumination system of claim 1, wherein the first optical path adjustment module comprises a first beam splitter configured to allow the first light to pass through and reflect the second light so as to allow the first light and the second light to enter the first optical path.

3. The illumination system of claim 2, further comprising a third light source configured to emit a third light at least corresponding to a third waveband, wherein the third waveband is different from the first waveband and the second waveband, and the first optical path adjustment module further comprises a second beam splitter configured to guide the third light as well as the first light and the second light that enter the first optical path to the output optical path.

4. The illumination system of claim 3, wherein the third light source comprises a white light source and an adjustable filter, and the adjustable filter comprises a plurality of color filters and is configured to filter a white light emitted by the white light source so as to adjust a color of the third light.

5. The illumination system of claim 3, wherein the third light source comprises:
a red light emitting diode (LED) or a red laser source, configured to emit a red light;
a green LED or a green laser source, configured to emit a green light;
a blue LED or a blue laser source, configured to emit a blue light; and
an X beam splitter, configured to combine the red light, the green light and the blue light into the third light.

6. The illumination system of claim 3, wherein the first waveband corresponds to a non-visible light waveband, the second waveband corresponds to a non-visible light waveband, and the third waveband corresponds to a visible light waveband.

7. The illumination system of claim 3, further comprising:
a fourth light source, configured to emit a fourth light corresponding to a fourth waveband, wherein the fourth waveband is different from the first waveband, the second waveband and the third waveband; and
a fifth light source, configured to emit a fifth light corresponding to a fifth waveband, wherein the fifth waveband is different from the first waveband, the second waveband, the third waveband and the fourth waveband;
wherein the first optical path adjustment module further comprises:
a third beam splitter, configured to allow the fourth light to pass through and reflect the fifth light so as to allow the fourth light and the fifth light enter a second optical path;
wherein the second beam splitter is an X beam splitter and is further configured to guide the fourth light and the fifth light on the second optical path to the output optical path.

8. The illumination system of claim 1, wherein the first output light is a bright-field light.

9. The illumination system of claim 1, wherein the first dark-field light source comprises light sources distributed in a plurality of layers, and the light source controller is further configured to control the light sources in the first dark-field light source in a manner of individual layers to emit dark-field lights with multiple wavebands, multiple angles and multiple intensities.

10. The illumination system of claim 1, further comprising:

a third dark-field light source, configured to emit a third dark-field light;
a fourth dark-field light source, configured to emit a fourth dark-field light; and
a third optical path adjustment module, configured to adjust positions of the third dark-field light source and the fourth dark-field light source, so as to selectively use the third dark-field light or the fourth dark-field light as a third output light, which together with the first output light and the second output light irradiate the object under inspection;
wherein the third dark-field light and the fourth dark-field light correspond to different wavebands or angles, and an incident angle of the second output light irradiating the object under inspection is different from an incident angle of the third output light irradiating the object under inspection.

11. The illumination system of claim 10, wherein the light source controller is configured to:
in a first mode, simultaneously enable at least one of the first light source, the second light source, the third light source, the fourth light source and the fifth light source, and enable at least one dark-field light source of the first dark-field light source, the second dark-field light source, the third dark-field light source and the fourth dark-field light source; and
in a second mode, simultaneously enable at least one of the first light source, the second light source, the third light source, the fourth light source and the fifth light source, and enable at least one dark-field light source of the first dark-field light source, the second dark-field light source, the third dark-field light source and the fourth dark-field light source;
wherein a light source combination enabled by the light source controller in the first mode is different from a light source combination enabled by the light source controller in the second mode.

12. The-An illumination system, comprising:
a first dark-field light source, configured to emit a first dark-field light at least corresponding to a first waveband;
a second dark-field light source, configured to emit a second dark-field light at least corresponding to a second waveband, wherein the first waveband is different from the second waveband;
a light source controller, coupled to the first dark-field light source and the second dark-field light source, configured to individually control the first dark-field light source and the second dark-field light source;
a first optical path adjustment module, configured to guide at least one of the first dark-field light and the second dark-field light to an output optical path, wherein the first optical path adjustment module comprises a moving member configured to adjust positions of the first dark-field light source and the second dark-field light source, so as to select the first dark-field light or the second dark-field light as a first output light to irradiate an object under inspection;
a third dark-field light source, configured to emit a third dark-field light;
a fourth dark-field light source, configured to emit a fourth dark-field light; and
a third optical path adjustment module, configured to adjust positions of the third dark-field light source and the fourth dark-field light source, so as to selectively use the third dark-field light or the fourth dark-field light as a second output light, which together with the first output light irradiate the object under inspection;
wherein an incident angle of the first output light irradiating the object under inspection is different from an incident angle of the second output light irradiating the object under inspection.

13. An illumination method, comprising:
providing a first light source to emit a first light corresponding to a first waveband;
providing a second light source to emit a second light corresponding to a second waveband, wherein the first waveband is different from the second waveband;
guiding the first light and the second light to an output optical path by a first optical path adjustment module;
irradiating an object under inspection by a first output light output from the output optical path;
providing a first dark-field light source to emit a first dark-field light;
providing a second dark-field light source to emit a second dark-field light; and
adjusting positions of the first dark-field light source and the second dark-field light source, so as to selectively use the first dark-field light or the second dark-field light as a second output light; and
irradiating an object under inspection by the second output light together with the first output light;
wherein the first dark-field light and the second dark-field light correspond to different wavebands.

14. The illumination method of claim 13, further comprising:
providing a third light source to emit a third light at least corresponding to a third waveband, wherein the third waveband is different from the first waveband and the second waveband;
guiding the third light, the first light and the second light to the output optical path by the first optical path adjustment module.

15. The illumination method of claim 14, further comprising:
providing a fourth light source to emit a fourth light at least corresponding to a fourth waveband, wherein the fourth waveband is different from the first waveband, the second waveband and the third waveband; and
providing a fifth light source to emit a fifth light at least corresponding to a fifth waveband, wherein the fifth waveband is different from the first waveband, the second waveband, the third waveband and the fourth waveband; and
guiding the fourth light and the fifth light to the output optical path by the first optical path adjustment module.

16. The illumination method of claim 13, further comprising:
providing a third dark-field light source to emit a third dark-field light;
providing a fourth dark-field light source to emit a fourth dark-field light;
adjusting positions of the third dark-field light source and the fourth dark-field light source, so as to selectively use the third dark-field light or the fourth dark-field light as a third output light;
irradiating the object under inspection by the third output light together with the first output light and the second output light;
wherein the third dark-field light and the fourth dark-field light correspond to different wavebands, and an incident angle of the second output light irradiating the object under inspection is different from an incident angle of the third output light irradiating the object under inspection.

* * * * *